United States Patent [19]
Kitterman et al.

[11] Patent Number: 5,242,204
[45] Date of Patent: Sep. 7, 1993

[54] VISOR MOUNT

[75] Inventors: Dale C. Kitterman, Holland; Pamela A. Smyth, Grandville, both of Mich.

[73] Assignee: Prince Corporation, Holland, Mich.

[21] Appl. No.: 989,913

[22] Filed: Dec. 11, 1992

Related U.S. Application Data

[63] Continuation of Ser. No. 760,960, Jul. 17, 1991, abandoned.

[51] Int. Cl.5 .................................................. B60J 3/02
[52] U.S. Cl. ................................... 296/97.9; 248/289.1
[58] Field of Search ......... 296/97.1, 97.9, 97.11–97.13; 248/289.1

[56] References Cited

U.S. PATENT DOCUMENTS

| | | | |
|---|---|---|---|
| 3,017,217 | 1/1962 | Keating | 296/97.13 |
| 4,352,518 | 10/1982 | Prince et al. | 296/97.12 |
| 4,529,157 | 7/1985 | Suman et al. | 248/289.1 |
| 4,553,797 | 11/1985 | Marcus | 296/97.9 X |
| 4,569,552 | 2/1986 | Marks | 296/97.13 |
| 4,634,196 | 1/1987 | Nestell | 296/97.13 X |
| 4,729,590 | 3/1988 | Adams | 296/97.13 |
| 4,893,866 | 1/1990 | Dowd et al. | 296/97.11 X |
| 4,902,068 | 2/1990 | Dowd et al. | 296/214 |
| 4,989,911 | 2/1991 | Van Order | 296/97.9 |
| 5,031,954 | 7/1991 | Peterson et al. | 296/97.9 |
| 5,061,005 | 10/1991 | Van Order et al. | 296/97.9 |
| 5,062,608 | 11/1991 | Phelps et al. | 248/289.1 |
| 5,082,322 | 1/1992 | Cekander et al. | 296/97.9 |

FOREIGN PATENT DOCUMENTS 1251479 10/1971 United Kingdom ............ 296/97.13

Primary Examiner—Dennis H. Pedder
Attorney, Agent, or Firm—Price, Heneveld, Cooper, DeWitt & Litton

[57] ABSTRACT

A visor mounting system for mounting a visor to an aperture within a vehicle roof which includes a visor with a visor body and a pivot rod assembly including a pivot rod and a torque fitting mounted on the pivot rod. The assembly includes a torque collar providing a predetermined rotational torque between the torque collar and the torque fitting and a retainer assembly lockably receives the pivot rod assembly and includes a bayonet clip for locking the retainer assembly and visor pivot rod assembly attached thereto within an aperture formed in a vehicle roof.

17 Claims, 2 Drawing Sheets

VISOR MOUNT

This is a continuation of co-pending application Ser. No. 07/760,960 filed on Sep. 17, 1991, now abandoned.

BACKGROUND OF THE INVENTION

The present invention pertains to automotive visors, particularly in a mounting system for attaching a visor to the roof of a vehicle.

Visors are typically mounted to a pivot rod for allowing movement of the visor both from a raised stored position against the roof of the vehicle to a lowered use position for blocking sunlight from the front windshield position or the side window position. The mounting of visors, typically attached to an elbow pivot rod, has been the subject of a variety of different mounting arrangements. U.S. Pat. Nos. 3,017,217; 4,529,157; 4,553,797; 4,569,552; 4,634,196; 4,729,570; and 4,989,911 all disclose mounting systems for attachment of the end of a visor rod to the vehicle roof. Of these systems, the ones disclosed in U.S. Pat. Nos. 3,017,217; 4,529,157 and 4,729,570 employ a bayonet-type mounting system.

The U.S. Pat. No. 4,529,157 discloses a compressive bayonet-type mount which requires a single screw for compressively gripping the sheet metal roof between a backing member and the mounting bezel. The U.S. Pat. No. 4,729,570 discloses a twist-on type retainer clamp with a bezel on the opposite side of the sheet metal roof for compressively holding the mount to the sheet metal roof. While the '157 patent system requires a screw for attachment to the vehicle once it is inserted and rotated into a locking position, the '570 patent does not require a mounting screw. It does, however, require a special tool which rotates the mount into a locked position once inserted into a keyed aperture in the vehicle roof.

U.S. Pat. No. 3,017,217 discloses a multiple-section bayonet-type visor mount which utilizes the visor rod and attached visor as an installation tool. A compression spring is employed to hold the mount to slots within the vehicle roof thus requiring a significant upward force during installation.

As vehicle sheet metal design is improving, the thickness of the sheet metal has been reduced since strength can be achieved by fabricating the steel in a manner to provide the strength sufficient for vehicle roofs. It is not uncommon for a vehicle roof header, which receives the visor mount, to be approximately 2 mm in thickness. As a result, visor mounts must be designed to firmly grip the relatively thin sheet metal roof header and yet provide a firm anchor point for the visor which is moved through several cycles during its life in the vehicle. The visor mount is a part of the overall visor assembly and it is also desirable to maintain the cost of this part of the visor assembly as low as possible to provide a cost-effective overall visor construction. It has been found that plastic material used as the interface material between the sheet metal roof and visor mount tends to elastically deform or "creep" with time, tending to loosen the visor upon use after installation. As a result, it is desirable to utilize a metal visor mounting structure if possible, at least for the contact with the metal roof member. Also it is desirable to eliminate or reduce any metal finishing steps required to remove burrs from stamped metal parts used in a visor mount and to provide a visor mount which does not require rigid tolerance constraints of the mount itself or the aperture to which it is secured.

SUMMARY OF THE PRESENT INVENTION

The visor mount of the present invention achieves these desired objectives by providing an improved twist-on bayonet-type mount in which the visor can be installed by inserting the visor with its mount through a keyed aperture in the roof support structure and rotating and locking the mount in position. Visors embodying the visor mounting system of this invention include a pivot rod assembly having a pivot rod and a torque fitting mounted on the pivot rod. The assembly also includes a torque collar providing a predetermined rotational torque between the torque collar and the torque fitting. The system also includes a retainer assembly for lockably receiving the pivot rod assembly and including a bayonet clip for locking the retainer assembly and visor pivot rod assembly attached thereto within an aperture formed in a vehicle roof.

The design of the visor mount accommodates finishing burrs to eliminate costly metal finishing steps and is designed to accommodate a fairly wide range of tolerance variations to also reduce the cost of manufacturing. As a result, the visor mount system of the present invention provides a cost-effective product with superior performance characteristics and ease of installation for the vehicle manufacturer during assemblyline production. These and other features, objects and advantages of the present invention will become apparent upon reading the following description thereof together with reference to the accompanying drawings in which:

DETAILED DESCRIPTION OF THE PREFERRED EMBODIMENT

Figure 1:
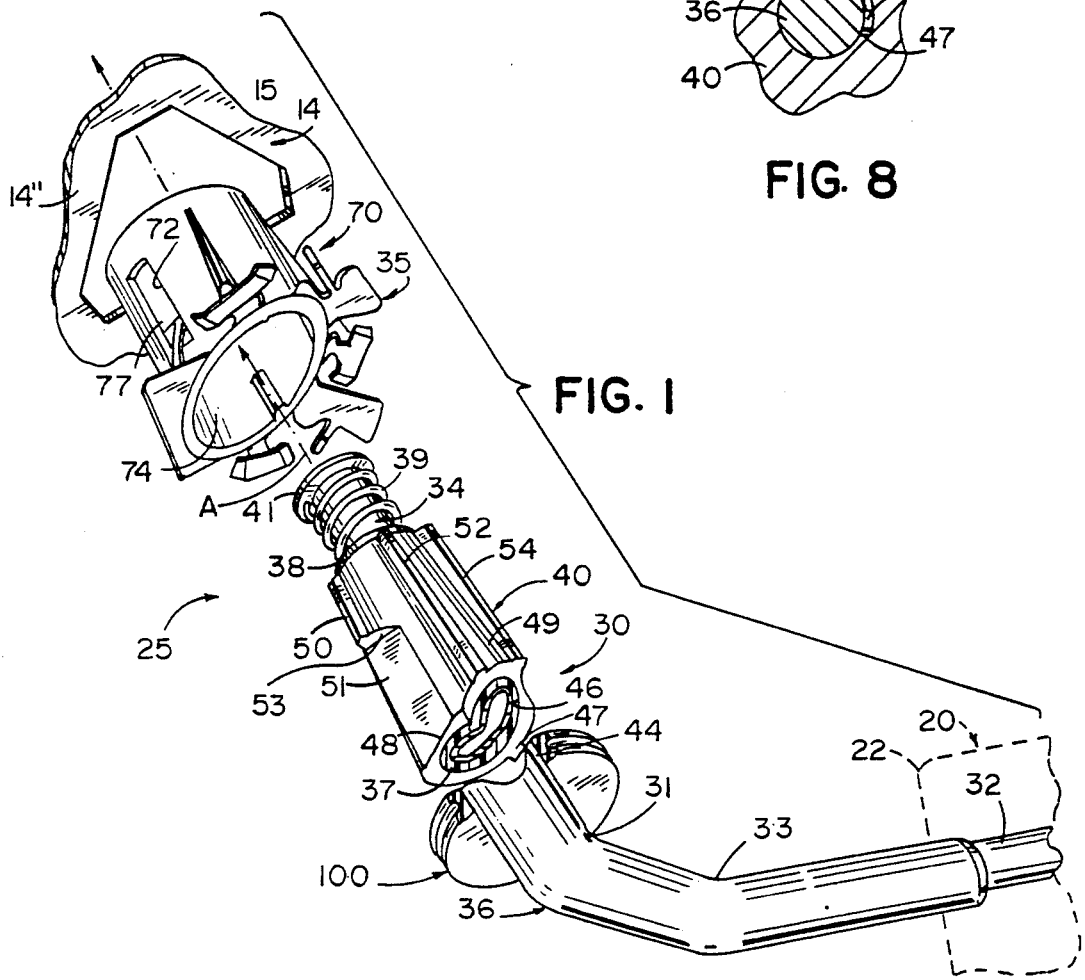
FIG. 1 is an enlarged exploded fragmentary and partly broken away view of the visor mounting assembly of the present invention.

Referring initially to FIG. 1 there is shown a visor assembly 20 for a vehicle such as an automobile. The vehicle will typically include a front windshield and a side window with an A-pillar therebetween (not shown). Above the front windshield there is provided a roof header beam 14, or other sheet metal structure, into which there is formed a generally triangular aperture 15 for receiving a visor rod mounting assembly 25 of the present invention. Covering the sheet metal roof and its structural elements is a headliner 16 (FIG. 2) which can be molded of a foam polymeric material, fiberboard or other suitable material typically used for headliner construction. The visor mounting assembly 25 includes two subassemblies including a pivot rod subassembly 30 and a retainer subassembly 35 which cooperate with one another for the mounting of the visor assembly 20 to the vehicle as described in greater detail below. A trim bezel 100, which is in the form of an oval grommet as seen in FIG. 1, is placed in the aperture in headliner 16 to provide a trim appearance to the installed visor assembly. A detailed description of the subassemblies forming the visor mounting assembly 25 is now presented.

The pivot rod subassembly 30 includes a generally hollow metallic pivot rod 32 which extends within the body of the visor 22 (shown in phantom form) and is secured therein by a torque fitting such as that disclosed in U.S. Pat. No. 4,500,131. The visor 22 has a folded core made of a molded polymeric material such as polypropolene. Alternately, it can be made of a fiberboard material folded in a butterfly-type construction such as disclosed in U.S. Pat. No. 5,007,532 in which case the torque control for mounting the end of rod 32 extending within the visor may be of the type disclosed in U.S. Pat. No. 5,004,289. Rod 32 has an end 34 which includes a pair of bends 31 and 33 to position the visor as desired in the vehicle for the movement between the front windshield operative position and side window operative position. A molded polymeric material defining a torque fitting 36 is molded over the end 34 of the visor rod and cooperates with a torque collar 40 extending over torque fitting 36 to provide a predetermined rotational torque for the visor during its normal operation.

Figure 2:
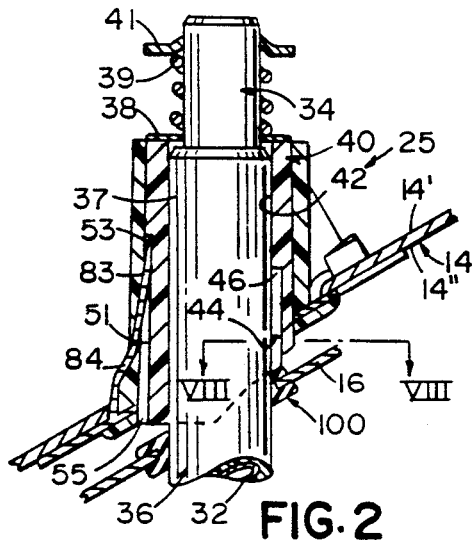
FIG. 2 is a vertical cross-sectional view of the visor mounting assembly shown in an installed position and taken along section line II—II of FIG. 3.
Figure 8:
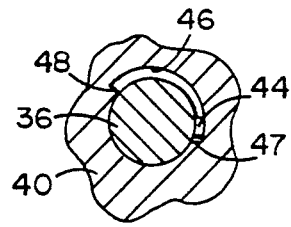
FIG. 8 is a sectional view taken on the line VIII—VIII of FIG. 2.

Torque fitting 36 can be molded of an ABS polyester material such as Valox and has a slightly conically tapered upper end 37 which mates with the similarly slightly conically tapered interior wall 42 of torque collar 40 to provide an interference fit between torque fitting 36 and torque collar 40. The torque collar 40 is held to the torque fitting 36 by means of a first washer 38, a compression spring 39 and a thrust washer 41 as seen in FIGS. 1 and 2 to secure the torque collar in seating engagement with torque fitting 36. The conically taper inter-fitting walls provide a pre-determined rotational torque between the torque collar 40 and fitting 36. As described below, collar 40 is in turn lockably inserted into the retainer subassembly 35.

The torque fitting 36 further includes an outwardly extending generally rectangular dog 44 (FIGS. 1 and 2) which extends within an arcuate slot 46 formed in the inner wall 42 of torque collar 40 to allow the desired arcuate movement of the visor pivot rod 32 within torque collar 40 for movement between the front windshield position and the side window position. The edges 47 and 48 of aperture 46 define stops against which dog 44 engage to limit the rotational motion of the visor between these two extreme positions.

Figure 3:
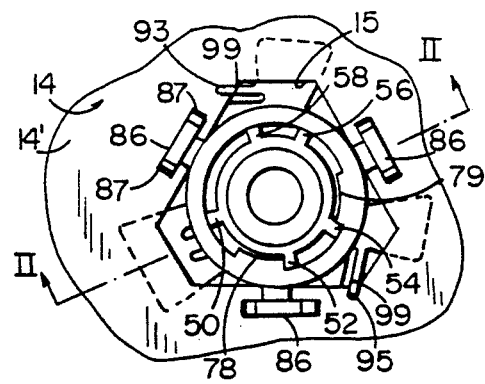
FIG. 3 is a top plan view of the structure shown in FIG. 2.

The torque collar 40, in addition to providing a predetermined rotational torque between its inner aperture 42 and the outer surface of torque fitting 36, includes means for interlocking the subassembly 30, including pivot rod torque fitting 36 and torque collar 40, to the retaining member 35. It is locked into position with respect to member 35 against the rotation once installed and also inadvertent removal although permitting removal if necessary for service. For such purpose, torque collar 40 includes a plurality of spaced radially outwardly extending longitudinal ribs 50, 52, 54, 56 and 58 as seen in FIGS. 1-3. These ribs lockably engage the sidewalls of grooves formed in retainer subassembly 35 as described in greater detail below. The outer sidewall 49 of torque collar 40 includes a flat 51 formed thereon which defines a generally horizontally extending stop 53 which is engaged as best seen in FIG. 2, by the end 83 of locking arm 84. The locking spring arm 84 is integrally formed with a rotary bayonet clip 80 which is shown in detail in FIGS. 4 and 5. Thus, once snap fit within the retainer subassembly 35, spring clip 84 lockably holds the pivot rod subassembly 30 into position within the retainer subassembly 35 against removal. The end 83 of arm 84 may be configured to grip stop 53 better such as by providing a V-shaped end. A clearance slot 55 is defined by flat 51, as shown in FIG. 2, which allows a flat instrument to be inserted into slot 55 to urge arm 84 outwardly through an aperture 72 in the collar guide 70 for removal of the visor 22 for service if necessary. A more detailed description of the retainer subassembly 35 now follows in connection with FIGS. 4-7.

Figure 7:
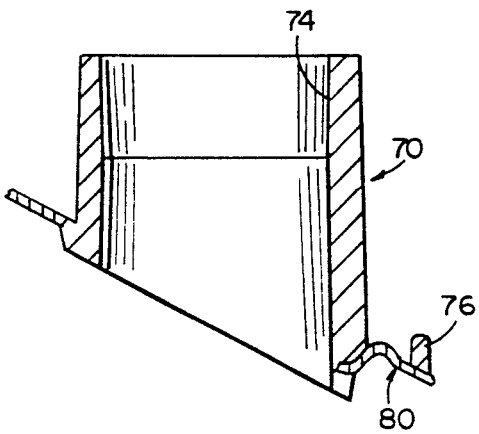
FIG. 7 is a vertical cross-sectional view of the structure shown in FIG. 6 taken along section line VII—VII FIG. 6.
Figure 6:
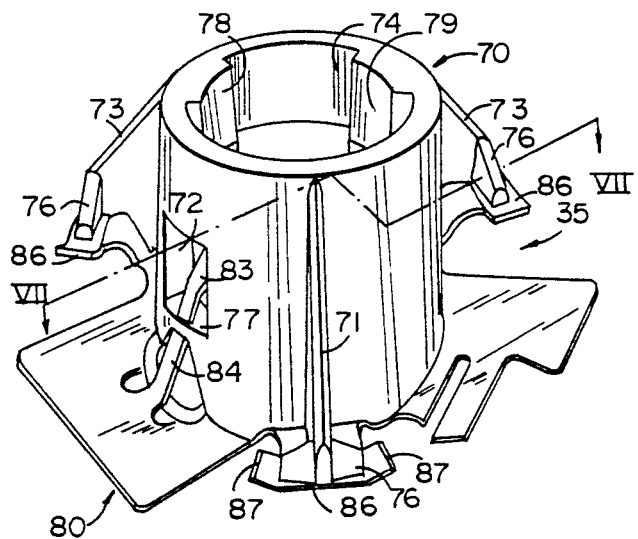
FIG. 6 is an enlarged perspective view of the rotary clip mounted to a collar guide and forming a retainer subassembly of the present invention.

As seen in FIG. 6, the retainer subassembly 35 includes both the collar guide 70 which is molded of a polymeric material, for example, an acetal such as Celcon which in the preferred embodiment integrally includes the metallic rotary bayonet spring clip 80 which is embedded and molded within the collar guide 70 as also seen in FIG. 7. The collar guide 70 includes a slightly conically tapered interior wall 74 which conforms to the slightly conically tapered surfaces of each of the ribs 50, 52, 54, 56 and 58 of the torque collar 40 to provide a tight interlocking interfit between the torque collar 40 and collar guide 70. The collar guide includes three generally triangular reinforcing ribs 71, 73 and 75 which each terminate in a foot 76 which overlies and reinforces upper locking shoes 86 of the rotary bayonet clip 80 as best seen in FIG. 6. The collar guide 70 also includes an aperture 72 allowing the end 83 of clip 84 to flex outwardly during the installation of the visor assembly and if necessary for removal.

Arm 84 is supported by integrally molding a sidewall section 77 of the collar guide 70 over the arm 84 as seen in FIG. 6. The collar guide 70 also includes a pair of inwardly projecting arcuate stops 78 and 79 with interfacing sidewalls which lockably engage ribs 52 and 54 as best seen in FIG. 3 for locking the torque collar 40 against rotation within the collar guide 70 once installed. This construction allows for the minimum use of material and still provides sufficient rigidity and sufficient strength through the utilization of five generally equally spaced outwardly projecting ribs on the torque collar 40 and the pair of interlocking stops 78 and 79 on the collar guide 70. Other arrangements such as providing grooves within the sidewall 74 of collar guide 70 for receiving the outwardly extending ribs of the torque collar can also be used.

The rotary bayonet clip 80 is molded within the lower end of collar guide 70 and includes the three equally spaced (at 120 intervals) upwardly curved upper feet 86 each having upwardly tipped ends 87 to facilitate their overlapping the upper surface 14', of header beam 14 as seen in FIG. 3. The bayonet clip 80 also includes three generally equally spaced lower support pads 92, 94 and 96. Pads 92 and 94 include upwardly and outwardly extending spring arms 93 and 95 respectively, which have vertical end walls 99 (FIGS. 3 and 5) to engage the edge of triangular aperture 15 as seen in FIG. 3 to limit the rotation of clips 80 to an installed position with the tips of arms 93 and 95 overlying surface 14', Support pads 92 and 94 engage the undersurface 14" of header 14 as best seen in FIG. 2 and compressively engage member 14 which is held between the upper feet 86 and lower pads 92, 94 and 96 to prevent rattling or tilting of the visor mount assembly 25 once installed as seen in FIG. 2. Thus, the clearance between the upper surfaces of pads 92, 94 and 96 and the lower surfaces of feet 86 is spaced less than 2 mm which is the approximate dimension of the thickness of roof header 14 compressively engaged the sheet metal material 14 for holding the rotary bayonet clip 80 and its integral collar guide 70 within the vehicle roof once installed.

Figure 4:
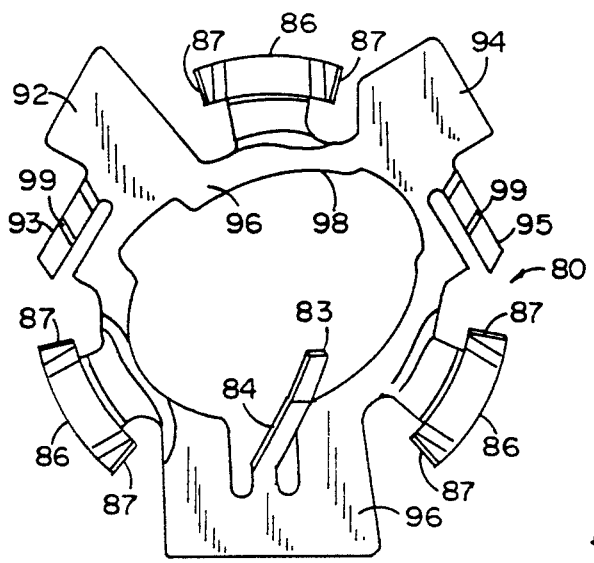
FIG. 4 is an enlarged top plan view of a rotary bayonet clip employed in the present invention.
Figure 5:
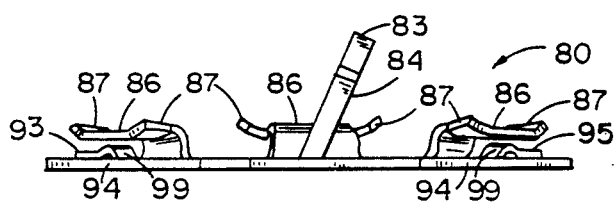
FIG. 5 is a front elevational view of the structure shown in FIG. 4.

Pad 96 integrally includes the upwardly formed arm 84 as best seen in FIGS. 4 and 5 and has a generally elliptical center opening 98 to provide clearance for the inclined conically tapered aperture 72 of collar guide 70.

The visor rod mounting assembly 20 is manufactured by molding the pivot rod torque fitting 36 to the end 34 of pivot rod 32 and extending the torque collar 40 thereover while press-fitting the washer 38, spring 39 and lock nut 41 thereover to complete the pivot rod subassembly 30 which is then installed in the visor body. The subassembly 30 is then pushed inwardly as indicated by arrow A in FIG. 1 into the retainer subassembly 35 which includes the collar guide 70 and integrally molded spring steel rotary bayonet clip 80. Subassembly 30 is inserted into subassembly 35 axially until the tip 83 of arm 84 engages stop 53 of torque collar 40 thereby locking the torque collar position within the retainer subassembly 35. As noted above, the visor pivot rod 32 is then rotated with respect to the retainer subassembly 35 such that the dog 44 on torque fitting 36 engages stop 47 within the arcuate aperture 46 of the torque collar 40.

In this position, the visor mounting assembly 25 is in a position whereupon the visor and assembly 25 is inserted upwardly through the triangular aperture 15 in header 14. As inserted, the feet 86 on rotary bayonet clip 80 clear the apices of the triangular aperture 15 but pads 92, 94 and 96 engage the sides of the apertures. The visor rod 32 is then rotated counterclockwise, as seen in FIG. 3, whereupon the leading edges 87 of feet 86 clear the top surface 14' of member 14 while the lower pads 92, 94 and 96 remain under the aperture and engage surface 14''. The lead-in arms 93 and 95, as best seen in FIG. 3, are elevated slightly above the surface of pads 92, 94 and 96 and include the end walls 99 which act as rotational stops engaging the edge of the aperture 15 for looking the rotary bayonet clip 80 in the installed position as shown in FIGS. 2 and 3. Once in the installed position, the grommet shaped bezel 100 is slipped over the aperture formed in headliner 16 and the visor installation is complete.

In the unlikely event that removal of the visor assembly is necessary, a flat bladed tool is inserted into the slot 55 shown in FIG. 2 to deflect the tip 83 of spring arm 84 outwardly releasing the subassembly 30 from subassembly 35 allowing the visor to be removed. The retainer subassembly 35, however, remains permanently installed within the vehicle.

It will become apparent to those skilled in the art that various modifications to the preferred embodiments of the invention as described herein can be made without departing from the spirit or scope thereof as defined by the appended claims.

The embodiments of the invention in which an exclusive property or privilege is claimed are defined as follows:

1. A visor mounting system for mounting a visor to an aperture within a vehicle roof comprising:
   a visor including a visor body;
   a pivot rod assembly including a pivot rod and a torque fitting mounted on said pivot rod, said assembly further including a torque collar providing a predetermined rotational torque between said torque collar and said torque fitting; and
   a retainer assembly for lockably receiving said pivot rod assembly and including a bayonet clip member for locking said retainer assembly and visor pivot rod assembly attached thereto within an aperture formed in a vehicle roof, wherein said bayonet member includes a first set of angularly spaced support members and a second set of support members each extending between a pair of said first support members and spaced vertically therefrom such that said first and second support members grip opposite sides of a roof support member to hold the visor to the vehicle when said retainer assembly is rotated.

2. The apparatus as defined in claim 1 wherein said torque collar includes means for lockably engaging said retainer assembly.

3. The apparatus as defined in claim 2 wherein said means on said torque collar for lockably engaging said retainer assembly comprises ledge means.

4. The apparatus as defined in claim 3 wherein said retainer assembly includes a collar guide for receiving said torque collar and preventing rotation of said collar within said retainer assembly.

5. The apparatus as defined in claim 3 wherein said bayonet clip member includes leg means engaging said ledge means of said torque collar for lockably holding said pivot rod assembly in said retainer assembly.

6. The apparatus as defined in claim 1 wherein said first set of support members comprise feet having upwardly curved ends and spaced outwardly from said pivot rod a distance to engage a top surface of a vehicle roof member when said retainer assembly is inserted and rotated in the aperture in the vehicle roof member.

7. The apparatus as defined in claim 1 wherein said second support members comprise pads spaced from said feet to compressively engage the opposite side of the vehicle roof member when said retainer assembly is rotated to an installed position.

8. The apparatus as defined in claim 1 wherein said bayonet member includes stop means for engaging an edge of the aperture in the vehicle roof member to limit the rotation of said retainer assembly to an installed position wherein said stop means includes a pair of spring arms, each spring arm of said pair of spring arms extending from separate pads of said second support members, each of said spring arms has a portion for limiting rotation of said retainer assembly and an extending distal portion for contacting the opposite side of a metal surface from that contacted by the pad supporting said spring arm.

9. A visor mounting assembly for mounting a visor to a roof support member of a vehicle which includes a generally polygonal aperture for receiving said mounting assembly, said visor mounting assembly comprising:
   a retainer assembly including a generally cylindrical guide member for receiving a visor torque collar, said retainer assembly further including a bayonet clip member having alternately staggered feet and pads which are vertically spaced from one another for gripping opposite sides of the roof support member, said feet and pads arranged in a pattern such that said feet can be extended into the aperture in the roof support member for installation of said retainer assembly upon rotation of said retainer assembly once inserted; and a visor pivot rod assembly for attachment to a vehicle visor, said pivot rod assembly including a pivot rod having a torque collar for providing a predetermined rotational torque between said torque collar and said pivot rod, said torque collar including means cooperating with said guide member of said retainer assembly for lockably mounting said collar into said retainer assembly.

10. The apparatus as defined in claim 9 wherein said bayonet clip member further includes means for limiting the rotation of said clip member in the aperture of the roof support member.

11. The apparatus as defined in claim 10 wherein said bayonet clip member includes means for lockably securing said torque collar in said guide.

12. A vehicle visor and mounting system for mounting the visor within an aperture formed in a vehicle roof comprising:

a visor including a pivot rod with an extending end having a torque fitting mounted on said end of said pivot rod;

a torque collar mounted on said torque fitting for providing a predetermined arc of rotational motion between said collar and said torque fitting and for providing a predetermined torque between said torque collar and said torque fitting; and a retainer assembly for lockably receiving said torque collar, said retainer assembly including a bayonet clip member for locking said retainer assembly and visor pivot rod attached thereto within the aperture formed in the vehicle roof, said bayonet clip member includes a first set of angularly spaced support members and a second set of support members each extending between a pair of said first support members and spaced vertically therefrom such that said first and second support members grip opposite sides of a roof support member to hold said visor to the vehicle.

13. The apparatus as defined in claim 12 wherein said first set of support members comprise feet having upwardly curved ends and spaced outwardly from said pivot rod a distance to engage a top surface of a vehicle roof member when said retainer assembly is inserted and rotated in the aperture in the vehicle roof member.

14. The apparatus as defined in claim 13 wherein said second support members comprise pads spaced from said feet to compressively engage the opposite side of the vehicle roof member when said retainer is rotated to an installed position.

15. The apparatus as defined in claim 14 wherein said bayonet clip member includes stop means for engaging an edge of the aperture in the vehicle room member to limit the rotation of said retainer assembly to an installed position.

16. The apparatus as defined in claim 14 wherein said second support members include oppositely directed spring arms extending from spaced pads for contacting the opposite side of said vehicle roof member from that contacted by said pads.

17. The apparatus as defined in claim 16 wherein each of said spring arms has a vertical stepped portion for limiting rotation of said bayonet clip member.

* * * * *

UNITED STATES PATENT AND TRADEMARK OFFICE
CERTIFICATE OF CORRECTION

PATENT NO. : 5,242,204
DATED : Sep. 7, 1993
INVENTOR(S) : Kitterman et al.

It is certified that error appears in the above-indentified patent and that said Letters Patent is hereby corrected as shown below:

Column 3, line 60
"looked" should be --locked--;

Column 5, line 8
Before "compressively" insert --to--;

Column 5, line 49
"looking" should be --locking--;

Column 8, Claim 15, Line 23
"room" should be --roof--;

Signed and Sealed this

Twenty-sixth Day of July, 1994

Attest:

BRUCE LEHMAN

Attesting Officer    Commissioner of Patents and Trademarks